US010641966B2

(12) United States Patent
Miao et al.

(10) Patent No.: US 10,641,966 B2
(45) Date of Patent: May 5, 2020

(54) FREE SPACE GRATING COUPLER

(71) Applicant: Futurewei Technologies, Inc., Plano, TX (US)

(72) Inventors: Rongsheng Miao, San Jose, CA (US); Zongrong Liu, Pleasanton, CA (US); Qianfan Xu, San Jose, CA (US); Xiao Shen, San Bruno, CA (US)

(73) Assignee: Futurewei Technologies, Inc., Plano, TX (US)

( * ) Notice: Subject to any disclaimer, the term of this patent is extended or adjusted under 35 U.S.C. 154(b) by 264 days.

(21) Appl. No.: 15/463,630

(22) Filed: Mar. 20, 2017

(65) Prior Publication Data
US 2017/0192175 A1 Jul. 6, 2017

Related U.S. Application Data

(62) Division of application No. 14/209,115, filed on Mar. 13, 2014, now Pat. No. 9,632,281.

(51) Int. Cl.
| *G02B 6/30* | (2006.01) |
| *G02B 7/02* | (2006.01) |
| *G02B 7/182* | (2006.01) |
| *G02B 6/34* | (2006.01) |
| *G02B 6/124* | (2006.01) |
| *G02B 6/32* | (2006.01) |
| *G02B 6/36* | (2006.01) |
| *G02B 6/12* | (2006.01) |

(52) U.S. Cl.
CPC ............... *G02B 6/30* (2013.01); *G02B 6/124* (2013.01); *G02B 6/32* (2013.01); *G02B 6/34* (2013.01); *G02B 7/02* (2013.01); *G02B 7/182* (2013.01); *G02B 6/322* (2013.01); *G02B 6/3636* (2013.01); *G02B 2006/12147* (2013.01); *Y10T 29/49016* (2015.01)

(58) Field of Classification Search
CPC ..... G02B 6/1342; G02F 1/2955; G02F 1/035; G02F 2202/20
See application file for complete search history.

(56) References Cited

U.S. PATENT DOCUMENTS

| 4,056,304 A | 11/1977 | Phillips |
| 4,867,524 A | 9/1989 | Courtney et al. |

(Continued)

FOREIGN PATENT DOCUMENTS

| CN | 101915965 A | 12/2010 |
| CN | 102540349 A | 7/2012 |
| CN | 103633551 A | 3/2014 |

OTHER PUBLICATIONS

Foreign Communication From a Counterpart Application, Chinese Application No. 201580012853.X, Chinese Search Report dated Nov. 16, 2017, 2 pages.

(Continued)

*Primary Examiner* — Minh N Trinh
(74) *Attorney, Agent, or Firm* — Conley Rose, P.C.

(57) ABSTRACT

A free space coupling system comprising a waveguide horizontally positioned on an integrated circuit, and a silicon housing coupled to the waveguide, wherein the silicon housing comprises a reflective surface, a first port, wherein the first port is configured to receive light from an optic source positioned substantially parallel to the waveguide at a coupling point, and a second port, wherein the second port is oriented at about ninety degrees with respect to the first port, and wherein the second port is aligned with a grating port on the waveguide.

20 Claims, 7 Drawing Sheets

(56) References Cited

U.S. PATENT DOCUMENTS

| | | | |
|---|---|---|---|
| 5,042,895 | A | 8/1991 | Chouinard et al. |
| 7,013,067 | B2 | 3/2006 | Ghiron et al. |
| 7,024,065 | B2 | 4/2006 | Katz |
| 8,280,207 | B2 * | 10/2012 | Pinguet .................. G02B 6/124 385/37 |
| 8,750,081 | B1 | 6/2014 | Peng et al. |
| 2005/0018993 | A1 | 1/2005 | Rolston et al. |
| 2010/0111473 | A1 | 5/2010 | Pinguet et al. |
| 2012/0045172 | A1 | 2/2012 | Feng et al. |
| 2014/0037244 | A1 | 2/2014 | Sorin et al. |
| 2015/0009508 | A1 | 1/2015 | Bachmann et al. |
| 2015/0260931 | A1 | 9/2015 | Miao et al. |
| 2017/0192175 | A1 * | 7/2017 | Miao ........................ G02B 7/02 |

OTHER PUBLICATIONS

Foreign Communication From a Counterpart Application, Chinese Application No. 201580012853.X, Chinese Office Action dated Nov. 27, 2017, 6 pages.

Partial English Translation and Abstract of Chinese Patent Application No. CN103633551A, Part 1, Aug. 10, 2015, 3 pages.

Partial English Translation and Abstract of Chinese Patent Application No. CN103633551A, Part 2, Aug. 10, 2015, 2 pages.

"Photonic Integration for Telecom Applications," imex Scientific Report, http://www.imex.be/scientificReport/SR2009/HTML/1213544.html, 2009, 4 pages.

Foreign Communication From a Counterpart Application, PCT Application No. PCT/CN2015/073877, International Search Report dated Jun. 10, 2015, 7 pages.

Foreign Communication From a Counterpart Application, PCT Application No. PCT/CN2015/073877, Written Opinion dated Jun. 10, 2015, 6 pages.

Office Action dated Feb. 5, 2016, 7 pages, U.S. Appl. No. 14/209,115, filed Mar. 13, 2014.

Office Action dated May 3, 2016, 18 pages, U.S. Appl. No. 14/209,115, filed Mar. 13, 2014.

Notice of Allowance dated Dec. 27, 2016, 6 pages, U.S. Appl. No. 14/209,115, filed Mar. 13, 2014.

\* cited by examiner

FREE SPACE GRATING COUPLER

CROSS-REFERENCE TO RELATED APPLICATIONS

This application is a divisional application of U.S. patent application Ser. No. 14/209,115 filed on Mar. 13, 2014 by Futurewei Technologies, Inc. and titled "Free Space Grating Coupler," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical fibers may have been widely used for the propagation of optical signals, especially to provide high speed communication links. Optical links using fiber optics may have various advantages over electrical links, for example, comparatively large bandwidths, comparatively high noise immunity, comparatively reduced power dissipation, and comparatively minimal crosstalk. Optical signals carried by optical fibers may be processed by a wide variety of optical and/or optoelectronic devices, including integrated circuits.

Photonic integration, or the coupling of the end of an optical fiber to the edge of an integrated circuit, may be playing an increasingly important role in optical systems. As used herein, the phrase photonic integration may mean optical coupling between an optical waveguide and an optical fiber. Photonic integration may bring about various benefits, such as a relatively smaller footprint, a higher port density, a reduced power consumption, and/or a reduced cost, which may render photonic integration a promising technology for building the next generation of integrated optical devices, such as wavelength division multiplexing (WDM) transponders, transceivers, and other types of devices.

Coupling light in and out of the silicon waveguide chip may be a challenging area due to the differences in waveguide structure from conventional waveguides. Grating coupling is a historic solution to silicon chip coupling, wherein direct butt coupling places the end of an optical fiber in contact with the waveguide, for example, at an about vertical orientation with respect to a horizontal grating coupler.

SUMMARY

In one embodiment, the disclosure includes a free space coupling system comprising a waveguide horizontally positioned on an integrated circuit, and a silicon housing coupled to the waveguide, wherein the silicon housing comprises a reflective surface, a first port, wherein the first port is configured to receive light from an optic source positioned substantially parallel to the waveguide at a coupling point, and a second port, wherein the second port is oriented at about ninety degrees with respect to the first port, and wherein the second port is aligned with a grating port on the waveguide.

In another embodiment, the disclosure includes an apparatus for coupling a light element to a grating port on a waveguide comprising a housing having a first port and a second port, wherein the first port and the second port are positioned to accommodate the transmission of light between the light element and the waveguide, and wherein the first port is oriented at about ninety degrees with respect to the second port, a lens positioned in the housing for conditioning light communicated between the light element and the waveguide, and a mirror positioned in the housing, wherein the lens and the mirror are configured such that a first light received from the light element is focused on the grating port and a second light received from the waveguide is focused on the light element.

In yet another embodiment, the disclosure includes a method of constructing a free space coupler comprising using a fabrication process to create a silicon housing comprising a first port, a second port, a lens slot, and a mirror slot, wherein the first port is oriented at about ninety degrees with respect to the second port, wherein the first port is configured to accept an optical fiber, and wherein the angle of the mirror is matched with a light emitting angle for a lens such that light received via the first port passing through the lens is directed to the second port, affixing the lens at the lens slot, and affixing a gold-deposited mirror at the mirror slot.

In still another embodiment, the disclosure includes an apparatus for coupling a fiber element to a grating port on a waveguide consisting of a housing having a first port and a second port, wherein the first port and the second port are positioned to accommodate the transmission of light between the fiber element and the waveguide, and wherein the fiber element is coupled to the apparatus in a position substantially parallel to the waveguide, a lens positioned in the housing for conditioning light communicated between the fiber element and the waveguide, and a mirror positioned in the housing, wherein the lens and the mirror are configured such that a first light received from the fiber element is focused on the grating port and a second light received from the waveguide is focused on the fiber element.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In direct butt coupling methods, a fiber may be attached to a waveguide at a substantially right angle. In some methods, a small incidence angle may be desirable to avoid back reflection due to diffraction of the grating. In the direct butt coupling methods, the fiber may have to be bent, looped, or otherwise routed to obtain adequate coupling. Direct butt coupling between a single mode fiber and a photonic waveguide may carry certain disadvantages, for example, coupling loss or leakage, mismatch with respect to the fiber mode and the mode of silicon chip, difficulties in mechanical alignment, fiber bending, casing size, etc.

Disclosed herein are techniques for free space coupling which may minimize and/or eliminate one or more of the disadvantages from direct butt coupling by permitting coupling along a substantially parallel plane with respect to the waveguide instead of direct butt coupling. The disclosed techniques for free space coupling may include utilizing a solid state free space coupling device comprising a lens, a mirror, and a silicon housing. Some embodiments may focus light from a divergent light beam using a lens, while other embodiments may alter collimated light to focus on a grating port. These and other techniques are discussed further below. Benefits from using the disclosed techniques may include a bandwidth which may be inversely proportional to the mode diameter of the out-of-plane beam. For a customary single mode fiber (SMF), the beam mode diameter may be about nine to ten micrometers (μm) and the corresponding bandwidth may be too small for coarse wavelength division multiplexing. As will be understood by those of skill in the art, the techniques disclosed are not limited in this way, and may accommodate a beam mode size appreciably smaller than customary SMF, for example, having a beam mode diameter of about three to four μm, thereby permitting grating couplers with wider bandwidths. Further, production costs involved with this disclosure may be appreciably lower and packaging may be more compact with respect to systems employing direct butt coupling methods.

Figure 1:
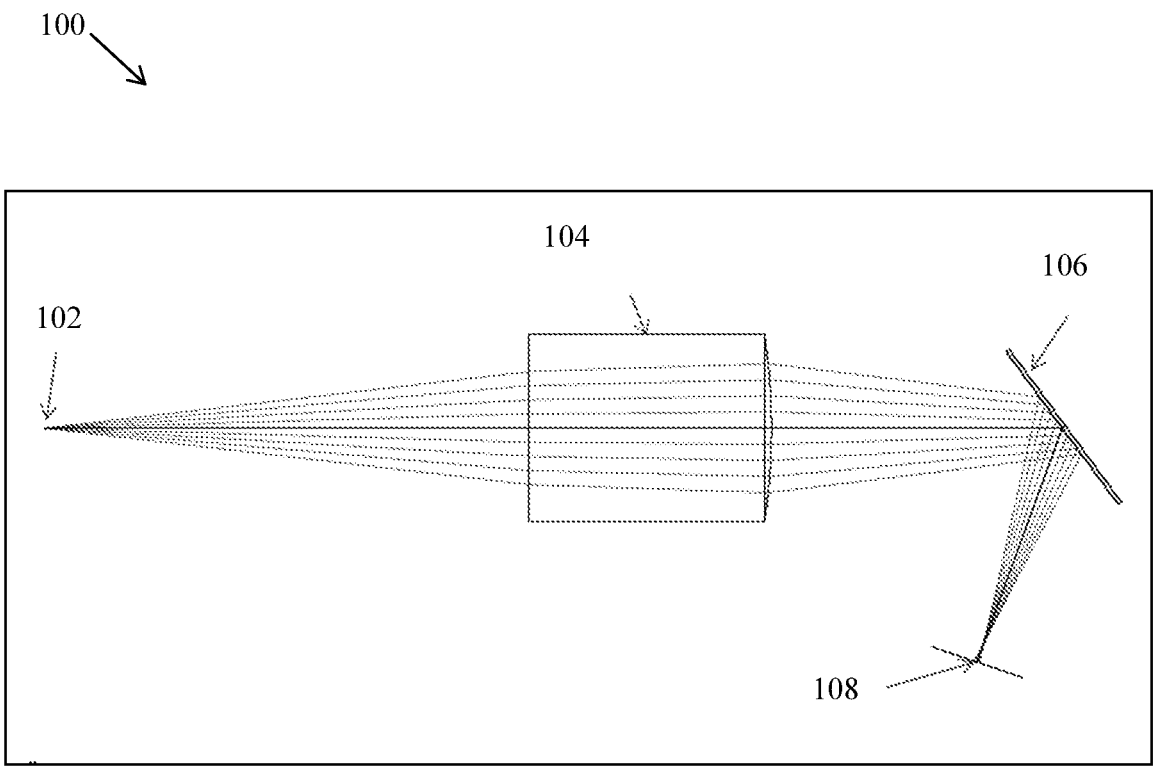
FIG. 1 is a schematic diagram of an embodiment of a free space coupling optical scheme for use with divergent light.

FIG. 1 is a schematic diagram of an embodiment of a free space coupling optical scheme 100 for use with divergent light. As used herein, the divergent light may refer to a beam of light whose cross-section increases with the distance from the source of the light. In the free space coupling optical scheme 100, divergent light 102, for example, a light having a beam mode diameter of about one to ten μm, may exit an optical element (e.g. a fiber, a laser diode (LD) array, or an LD chip), and may enter a lens 104 (e.g. a silicon or glass micro lens). Lens 104 may focus and/or condition the light 102 such that the output light 102 may be reflected of and/or bent by a reflective surface 106 (e.g. a gold-deposited mirror), and focused on a grating port 108, for example, a grating port comprising a silicon-on-insulator (SOI) substrate for a silicon waveguide, such as a strip loaded waveguide, a channel waveguide, a rib waveguide, a ridge waveguide, etc. As will be understood by those of skill in the art, in some embodiments, the light 102 may originate at the waveguide, and in such embodiments the free space coupling optical scheme 100 may function in a substantially similar manner, but in a reverse direction. For example, the light 102 may be emitted from the grating port 108, for example, a waveguide-to-fiber surface grating coupler, pass through a focusing and/or conditioning lens 104 and pass into a fiber. In such embodiments, the angle of the mirror may be matched with the emitting angle of the grating port 108. When applying the free space coupling optical scheme 100, it may not be necessary to match the mode diameter of fiber to the mode diameter of the grating port as the lens may play a role of converting the mode diameter of fiber to the mode diameter of the grating port.

Figure 2:
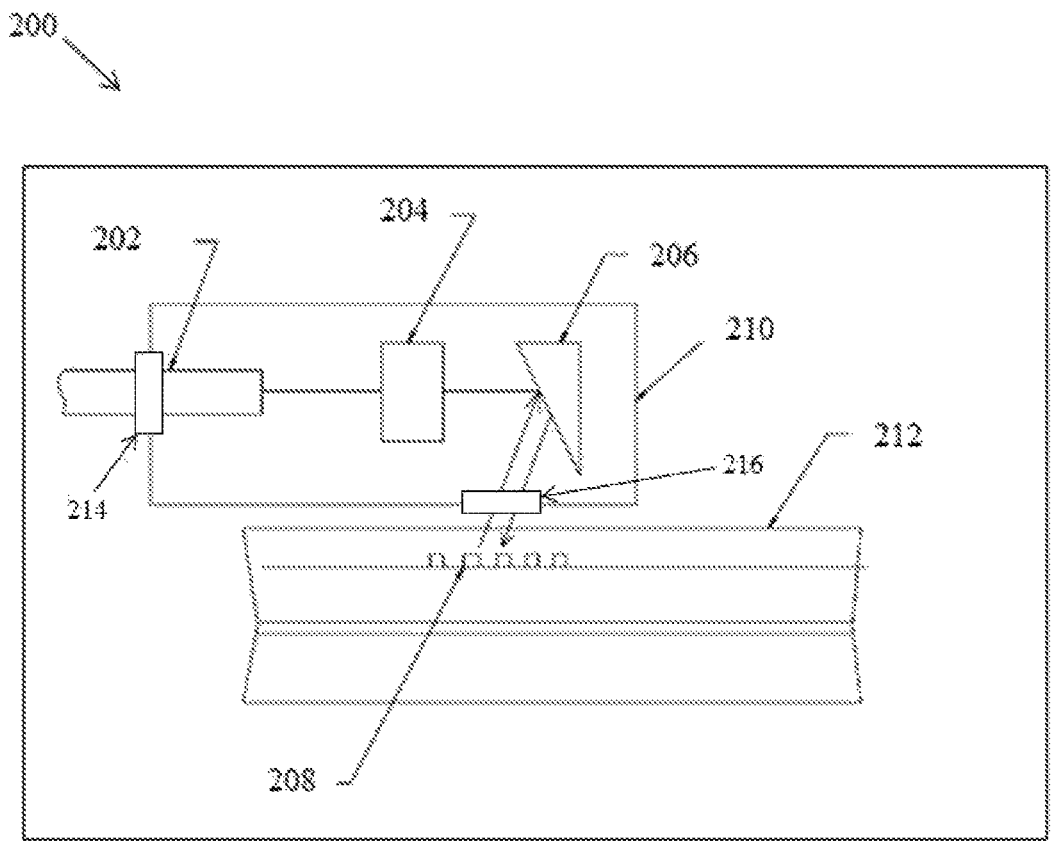
FIG. 2 is a cross-sectional view of an embodiment of a free space coupler in a coupling position.

FIG. 2 is a cross-sectional view of an embodiment of a free space coupler 200 in a coupling position. The free space coupler 200 may employ the free space coupling optical scheme 100 for use with divergent light. The free space coupler 200 may comprise a fiber 202, a lens 204, a reflective surface 206, and a housing 210. The fiber 202 may be constructed from silicon dioxide or other suitable materials. The lens 204 may be a silicon lens or a glass lens. In some embodiments, the reflective surface 206 may be manufactured using photolithography and/or wet etching.

In some embodiments, the housing 210 may be a silicon housing. The fiber 202 may be bonded to the housing 210, for example, using a wet etched v-groove. The lens 204 and reflective surface 206 may be bonded to the housing 210, for example, employing a passive bonding process. The lens 204 may be mounted to the housing 210, for example, using a dry etched trench. The housing 210 may be manufactured using photolithography and/or wet or dry etching, and thus the angle of the reflective surface 206 may be made by photolithography and/or anisotropic wet etching on the silicon housing. Thus, the lens 204 and the fiber 202 may only require a passive alignment process instead of the typical active alignment process. The process of manufacturing the angle for the reflective surface 206 may result in the reflective surface 206 with respect to the vertical axis within a high accuracy (e.g. about plus or about minus 0.1 degree). The resulted angle of the reflective surface is the same as the crystalline angle of the silicon. Embodiments using wet and/or dry etching during the manufacturing and/or finishing process may use various masks (e.g. to define an area to be protected for etching) known to those of skill in the art for either/both the wet or dry etching process. For examples, silicon-nitride ($SiN_x$) films, silicon-oxide ($SiO_x$) films, and/or metal films may be used as masks.

The free space coupler 200 may be coupled to a grating port 208 embedded into a waveguide 212, for example, a silicon waveguide. The housing 210 may comprise a first port 214 for accommodating the fiber 202 and a second port 216 for accommodating light to and/or from the waveguide 212. As shown, the first port 214 may be oriented about ninety degrees with respect to the second port 216.

Figure 3:
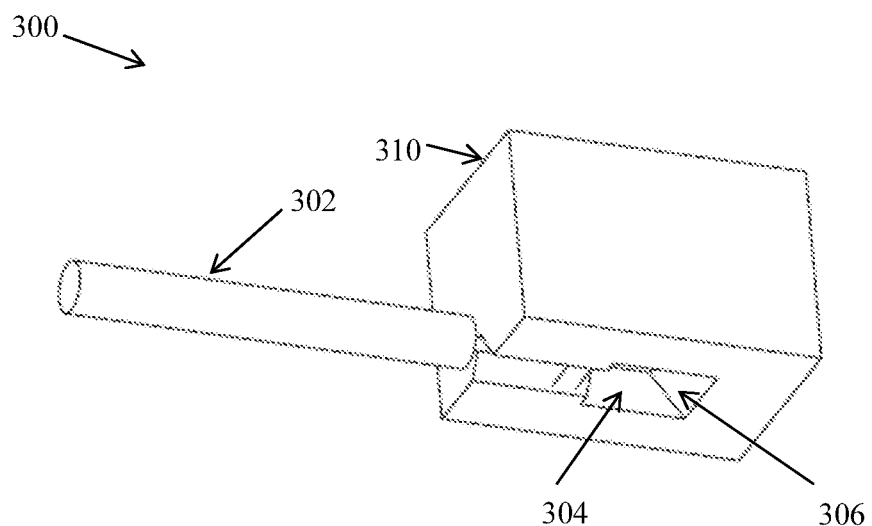
FIG. 3 is a perspective view of an embodiment of a free space coupler for use with divergent light.

FIG. 3 is a perspective view of an embodiment of a free space coupler 300 for use with divergent light. The components of the free space coupler 300 may be substantially the same as the components of the free space coupler 200 except as otherwise noted. The free space coupler 300 may comprise a fiber 302, a lens 304, a reflective surface 306, and a housing 310. The fiber 302 may be coupled to the housing 310 in a position substantially parallel to a waveguide, for example, using adhesive such as epoxy or a mechanical affixing structure. For example, the fiber 302 may be coupled to the housing 310 along an axial plane extending substantially parallel to an axial plane of the waveguide Such coupling may provide advantages, such as reducing fiber bending, minimizing casing size, etc. While the outer surface of the housing 310 is depicted as rectangular, those of skill in the art will understand that the depiction is merely illustrative and other shapes are both available and within the scope of this disclosure.

Figure 4:
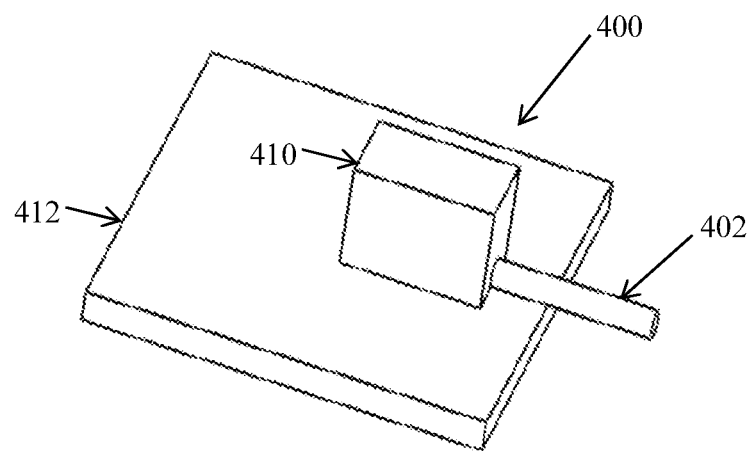
FIG. 4 is a perspective view of another embodiment of a free space coupler in a coupling position.

FIG. 4 is a perspective view of another embodiment of a free space coupler 400 in a coupling position. The components of the free space coupler 400 may be substantially the same as the components of the free space coupler 300 except as otherwise noted. The free space coupler 400 may comprise a fiber 402 and a housing 410. The free space coupler 400 may be mounted on waveguide 412 (e.g. waveguide 212). The fiber 402 may be coupled to the housing 410 in a position substantially parallel to the waveguide 412, for example, using adhesive such as epoxy or a mechanical affixing structure. In other words, the fiber 402 may be coupled to the housing 410 along an axial plane extending substantially parallel to an axial plane of the waveguide 412. Such coupling may provide advantages, such as reducing fiber bending, minimizing casing size, etc.

Figure 5:
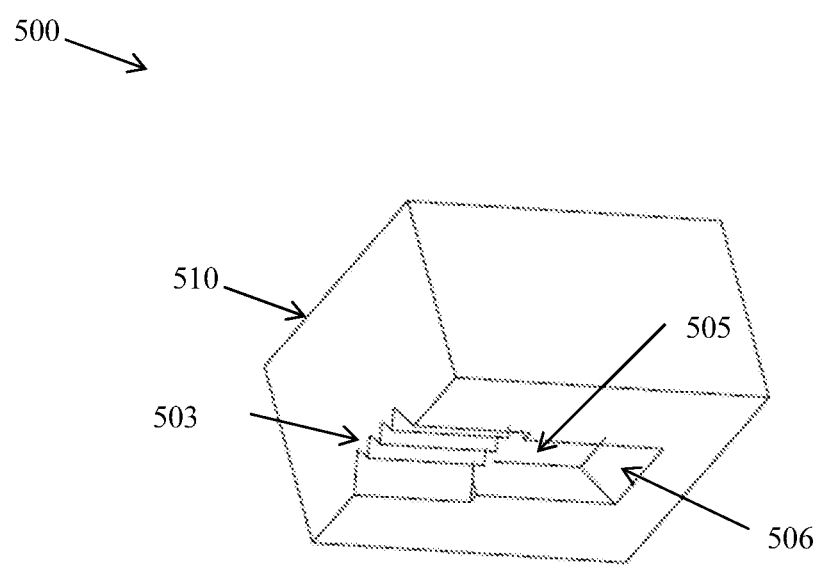
FIG. 5 is a perspective view of another embodiment of a free space coupler supporting multi-fibers integration.

FIG. 5 is a perspective view of another embodiment of a free space coupler 500 supporting multi-fibers integration. The components of the free space coupler 500 may be substantially the same as the components of the free space coupler 300 except as otherwise noted. The free space coupler 500 may comprise a reflective surface 506 and a lens slot 505, which may accommodate a lens (e.g. lens 304). In some embodiments, the lens slot 505 may be created by employing a dry etching process. As shown, the free space coupler 500 may be designed to integrate multiple fibers into a single silicon housing 510 to support multi-channel applications (e.g. utilizing multiple optical fibers). Fiber v-grooves 503 may be constructed using a manufacturing process, for example, via wet etching and/or photolithography, such that the pitch or the distance between fibers may be controlled to a comparatively high accuracy (e.g. about plus or minus one μm).

Figure 6:
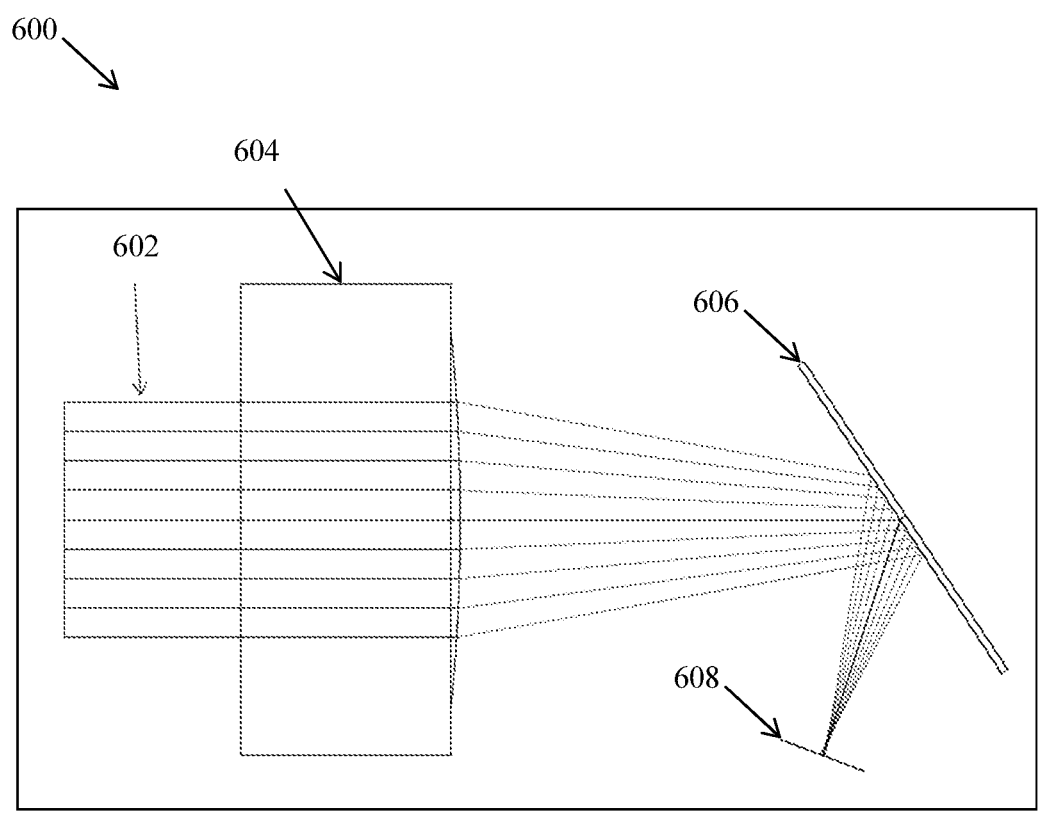
FIG. 6 is a schematic diagram of another embodiment of a free space coupling optical scheme for use with collimated light.

FIG. 6 is a schematic diagram of another embodiment of a free space coupling optical scheme 600 for use with collimated light. As used herein, collimated light may refer to a light beam comprising rays that are about parallel, and therefore collimated light may minimally spread as the light propagates from an originating source. Collimation may occur via a number of known processes, for example, using lenses, etc. In the free space coupling optical scheme 600, collimated light 602 may exit a fiber collimator or other optical element and may enter a lens 604. Lens 604 may focus the light 602 such that the output light 602 may be reflected off and/or bent by a reflective surface 606 and focused on a grating port 608 on a silicon waveguide.

Figure 7:
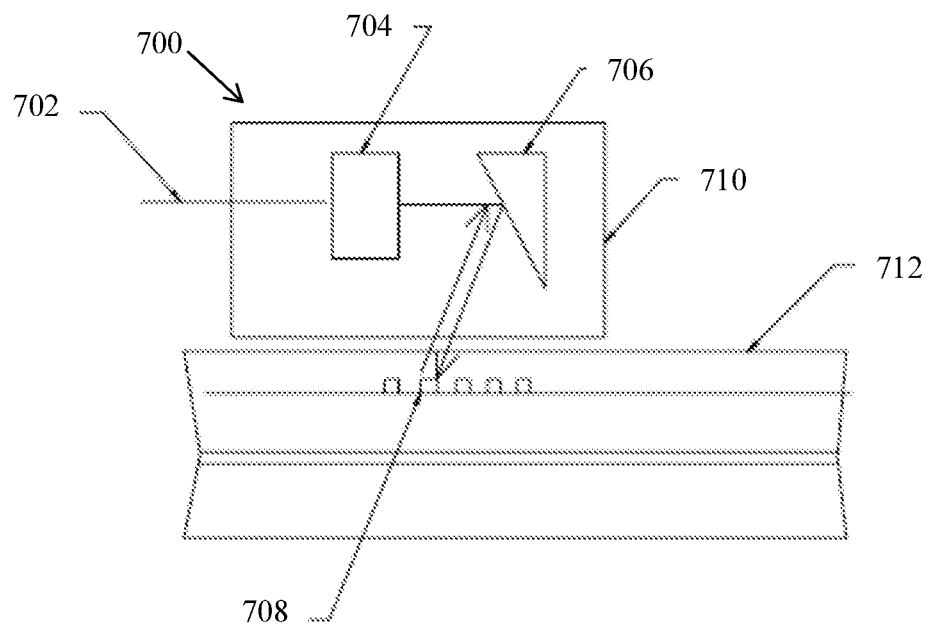
FIG. 7 is a cross-sectional view of another embodiment of a free space coupler in a coupling position.

FIG. 7 is a cross-sectional view of another embodiment of a free space coupler 700 in a coupling position. The free space coupler 700 may be substantially similar to the free space coupler 200, but without a fiber (e.g. fiber 202) coupled to the housing 710 and may employ the free space coupling optical scheme 600 for use with collimated light instead of divergent light. The free space coupler 700 may comprise a lens 704 and a reflective surface 706 encased in a housing 710. Specifically, a light beam 702 (e.g. collimated light beam emitted from an LD) may be coupled to the housing 710 along an axial plane extending substantially parallel to an axial plane of a waveguide 712. It should be noted that the angle of light reflection off reflective surface 706 as depicted in FIG. 7 is merely illustrative, and those of skill in the art will understand that such angles may be optionally selected, for example, during the design phase, to maximize the desired optical characteristics of interaction between the grating port 708 on the waveguide 712 and the light beam 702.

Figure 8:
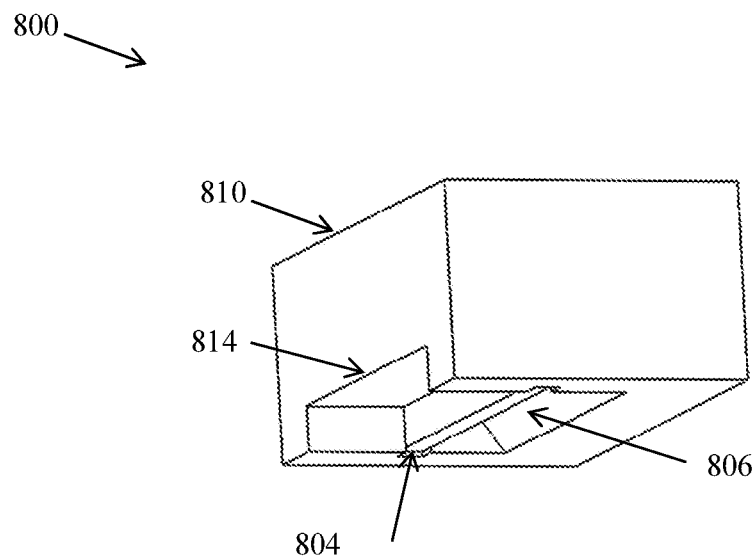
FIG. 8 is a perspective view of another embodiment of a free space coupler for use with collimated light.

FIG. 8 is a perspective view of another embodiment of a free space coupler 800 for use with collimated light. The components of the free space coupler 800 may be substantially the same as the components of the free space coupler 400. The free space coupler 800 may comprise a lens 804, a reflective surface 806, a housing 810, and a port 814. The lens 804 may be wider than the lens 704 to accommodate a wider beam and/or multiple beams of light, for example, collimated light emitted from a light source received through the port 814. The width of the port 814 may be selected based on the light characteristics of the light source. The lens 804 may be bonded to the housing 810, for example, employing a passive bonding process.

Figure 9:
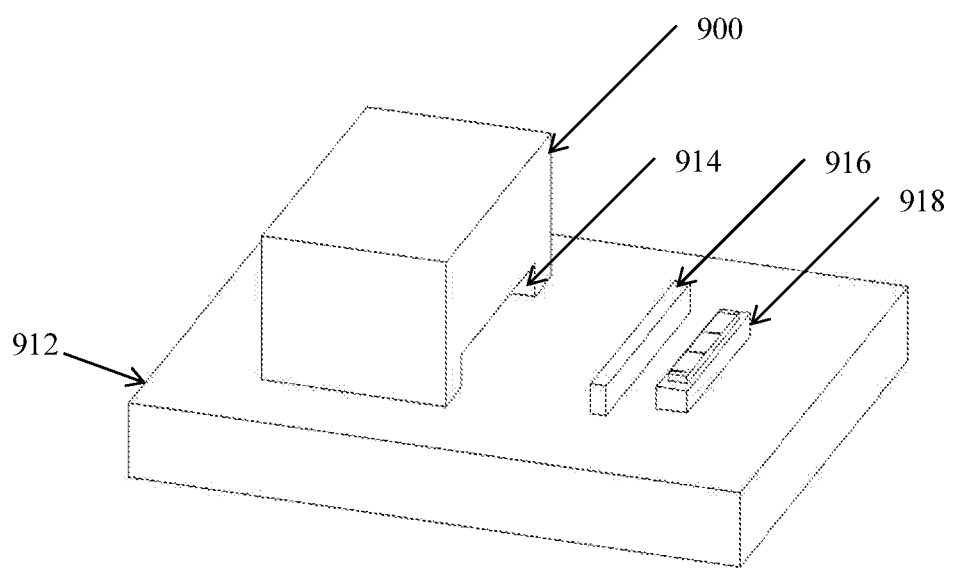
FIG. 9 is a perspective view of another embodiment of a free space coupler in a coupling position.

FIG. 9 is a perspective view of a free space coupler 900 in a coupling position. The components of the free space coupler 900 may be substantially the same as the components of the free space coupler 800 except as otherwise noted. In FIG. 9, the free space coupler 900 may be mounted on a waveguide 912. The free space coupler 900 may comprise a port 914 for receiving light. An LD array or LD chip 918 may be positioned on the waveguide 912. A lens 916 may be positioned on the waveguide 912 to convert the divergent laser beam emitted from the LD array 918 into collimated light before passing into the free space coupler 900 via a port 914. The free space coupler 900 may further comprise a second lens internal to the free space coupler 900, where the second lens may shape and/or pass the collimated light through to a reflective surface and then focus onto a grating port on the waveguide 912.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a housing having a first port and a second port, wherein the first port and the second port are positioned to accommodate a transmission of light between a light element and a waveguide, and wherein the first port is oriented at about ninety degrees with respect to the second port;
   a lens positioned in the housing for conditioning light communicated between the light element and the waveguide; and
   a mirror positioned in the housing separate from the lens such that the lens is positioned between the first port and the mirror,
   wherein the lens and the mirror are configured such that a first light received from the light element is focused on a grating port and a second light received from the waveguide is focused on the light element.

2. The apparatus of claim 1, wherein the first light is collimated light.

3. The apparatus of claim 1, wherein the first light is divergent light.

4. The apparatus of claim 1, wherein the light element is a fiber, and wherein the first light has a mode diameter of about three to about ten micrometers (μm).

5. The apparatus of claim 1, wherein the light element is an optical fiber.

6. The apparatus of claim 1, wherein the light element is an optical fiber collimator.

7. The apparatus of claim 1, wherein the light element is a laser diode (LD) device.

8. The apparatus of claim 1, wherein the first port is configured to optically couple to the light element.

9. The apparatus of claim 1, wherein the lens is optically coupled to the first port.

10. The apparatus of claim 1, wherein the mirror is optically coupled to the lens.

11. The apparatus of claim 1, wherein the second port is optically coupled to the mirror.

12. The apparatus of claim 1, wherein the second port is configured to optically couple to the grating port.

13. The apparatus of claim 12, wherein the grating port is on the waveguide.

14. The apparatus of claim 1, further comprising the waveguide.

15. The apparatus of claim 14, wherein the waveguide comprises the grating port.

16. The apparatus of claim 1, wherein the housing comprises silicon.

17. The apparatus of claim 1, wherein the mirror is positioned between the lens and the second port.

18. An apparatus comprising:
    a housing having a first port and a second port, wherein the first port and the second port are positioned to accommodate a transmission of light between a light element and a waveguide, wherein the first port is oriented at about ninety degrees with respect to the second port, wherein the first port comprises a plurality of v-grooves, wherein the light element comprises a plurality of fibers, and wherein the v-grooves are configured to control a pitch spacing between each fiber;
    a lens positioned in the housing for conditioning light communicated between the light element and the waveguide; and
    a mirror positioned in the housing,
    wherein the lens and the mirror are configured such that a first light received from the light element is focused on a grating port and a second light received from the waveguide is focused on the light element.

19. The apparatus of claim 18, wherein the first port is configured to optically couple to the light element, wherein the lens is optically coupled to the first port, wherein the mirror is optically coupled to the lens, wherein the second port is optically coupled to the mirror, and wherein the second port is configured to optically couple to the grating port.

20. The apparatus of claim 18, further comprising the waveguide, wherein the waveguide comprises the grating port.

* * * * *